US010591382B2

(12) United States Patent
Canfield et al.

(10) Patent No.: US 10,591,382 B2
(45) Date of Patent: *Mar. 17, 2020

(54) METHOD AND APPARATUS FOR INDUCING MULTIAXIAL EXCITATION (71) Applicant: INTERNATIONAL BUSINESS MACHINES CORPORATION, Armonk, NY (US)

(72) Inventors: Shawn Canfield, Poughkeepsie, NY (US); Steven C. McIntosh, Kingston, NY (US); Budy D. Notohardjono, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/191,580

(22) Filed: Nov. 15, 2018

(65) Prior Publication Data

US 2019/0078969 A1 Mar. 14, 2019

Related U.S. Application Data (63) Continuation of application No. 15/145,921, filed on May 4, 2016, now Pat. No. 10,161,826.

(51) Int. Cl.
*G01M 7/02* (2006.01)
*G01M 7/06* (2006.01)
*F16C 11/10* (2006.01)

(52) U.S. Cl.
CPC .............. *G01M 7/022* (2013.01); *G01M 7/02* (2013.01); *G01M 7/06* (2013.01); *F16C 11/106* (2013.01); *F16C 2370/00* (2013.01)

(58) Field of Classification Search
CPC .......... G01M 7/00; G01M 7/02; G01M 7/022; G01M 7/027; G01M 7/04; G01M 7/06; G01M 7/08; F16C 11/06

(Continued)

(56) References Cited

U.S. PATENT DOCUMENTS 4,011,749 A * 3/1977 Cappel .................... G01M 7/06
73/665
5,423,523 A 6/1995 Gossman et al.
(Continued)

FOREIGN PATENT DOCUMENTS

EP 2 192 383 A1 6/2010
EP 2 267 407 A1 12/2010
(Continued)

OTHER PUBLICATIONS

Habtour, E., et al., "Review of Response and Damage of Linear and Nonlinear Systems under Multiaxial Vibration" Hindawi Publishing Corporation 2014(294271):21 pages (2014).

(Continued)

*Primary Examiner* — Suman K Nath
(74) *Attorney, Agent, or Firm* — Scully, Scott, Murphy & Presser, P.C.; Tihon Poltavets (57) ABSTRACT An apparatus and method for inducing multiaxial vibrations to simulate an environment for transporting a stack of products is provided. A lower platform is provided for inducing uniaxial vibrations. A link is connected to the lower platform by a lower end of the link. The upper end of the link has a universal joint, through which the link is connected to an upper platform. The upper platform has a top surface, on which the stack of products can be placed. In operations, the uniaxial vibrations of the lower platform are transferred to the upper platform through the link and the universal joint, to induce pivotal movement of the upper platform with respect to the shaft of the link. As a result, multiaxial vibrations can be induced to the stack of products placed on the top surface of the upper platform.

8 Claims, 6 Drawing Sheets (58) Field of Classification Search
USPC .................................................. 73/662–669
See application file for complete search history.

(56) References Cited

U.S. PATENT DOCUMENTS

| | | |
|---|---|---|
| 5,811,821 A | 9/1998 | Alexander et al. |
| 5,816,926 A | 10/1998 | Lynch et al. |
| 6,586,854 B1 | 7/2003 | Nozawa et al. |
| 2007/0164189 A1 | 7/2007 | Corsaro et al. |
| 2012/0104219 A1* | 5/2012 | Kalms .................. F41F 3/0413 248/560 |
| 2012/0139175 A1 | 6/2012 | Lim |
| 2015/0285429 A1 | 10/2015 | Le |

FOREIGN PATENT DOCUMENTS

| | | |
|---|---|---|
| EP | 2 463 626 A3 | 12/2013 |
| WO | 2012/018118 A1 | 2/2012 |

OTHER PUBLICATIONS

List of IBM Patents or Patent Applications Treated as Related, dated Nov. 15, 2018, 2 pages.

\* cited by examiner

```
┌─────────────────────────────────────────┐
│ Providing a lower platform for inducing │
│            uniaxial vibrations          │
│                   510                   │
└─────────────────────────────────────────┘
                    ↓
┌─────────────────────────────────────────┐
│ Providing a link comprising a lower end,│
│ an upper end and a shaft extending      │
│ between the lower end and the upper end │
│                   520                   │
└─────────────────────────────────────────┘
                    ↓
┌─────────────────────────────────────────┐
│ Providing an upper platform, wherein the│
│ upper platform comprises a top surface  │
│ on which the stack of products can be   │
│                  placed                 │
│                   530                   │
└─────────────────────────────────────────┘
                    ↓
┌─────────────────────────────────────────┐
│ Connecting the link to the lower        │
│ platform by the lower end               │
│                   540                   │
└─────────────────────────────────────────┘
                    ↓
┌─────────────────────────────────────────┐
│ Connecting the link to the upper        │
│ platform by the universal joint, such   │
│ that the uniaxial vibrations of the     │
│ lower platform are transferred to the   │
│ upper platform through the universal    │
│ joint to induce pivotal movement of the │
│ upper platform about the universal      │
│ joint, such that multiaxial vibrations  │
│ can be induced to the stack of products │
│                   550                   │
└─────────────────────────────────────────┘
```

FIG. 8

METHOD AND APPARATUS FOR INDUCING MULTIAXIAL EXCITATION

BACKGROUND

The present disclosure and embodiments thereof are in the field of a mechanical testing instrument. More particularly, the present disclosure relates to an apparatus and method for simultaneously inducing multiaxial vibrations to simulate a complex vibration environment, in which products having generally high gravity centers are being handled.

During the shipping and transportation of certain products, such as electronic products or stackable products, the products and their associated handling mechanisms are subject to shocks and vibrations, which are typically vertical vibrations with some horizontal vibrations especially at the top stack location with a frequency bandwidth between 2-500 Hz. Food transportation (such as, transportation of potato chips) is subject to the same issue. In order to ensure that the transportation would not compromise the products' expected performance or cause damage to the products, a laboratory vibration test is typically conducted prior to shipping of the products to simulate a transportation environment, in which the products are vibrated in the vertical direction. Typically, a vertical uniaxial table is used for the simulation purpose. However, during the actual transportation of products (such as, during a truck shipment of the products), the upper part of a stack of the products is subject to a certain extent of horizontal shaking or vibration, which cannot be simulated by the vertical uniaxial table. Taking computer servers for example, due to the horizontal vibrations, certain components of the servers (such as, inserted cards) can become loosen or unseated, which cannot be detected by merely using vertical vibration simulation. Food transportation (such as, transportation of potato chips) is subject to the same issue. Thus, the vertical uniaxial table is not satisfactory in practice.

Alternatively, a triaxial table (such as, a triaxial table for seismic simulation) can be used for the simulation purpose. However, the triaxial table is cost prohibitive and can he used to simulate vertical vibrations with a narrower frequency bandwidth between 0.5-50 Hz.

Accordingly, there exists a need in the art to overcome the deficiencies and limitations described hereinabove with respect to the conventional vibration environment simulation systems.

SUMMARY

In one aspect of the present application, an apparatus for inducing multiaxial vibrations to simulate an environment for handling a stack of products is provided. The apparatus includes a lower platform for inducing uniaxial vibrations. The apparatus also includes a link, which includes a lower end, an upper end and a shaft extending between the lower end and the upper end. The link is connected to the lower platform by the lower end. The apparatus further includes a universal joint provided to the upper end of the link. The apparatus additionally includes an upper platform connected to the link by the universal joint. The upper platform has a top surface on which the stack of products can be placed. The uniaxial vibrations of the lower platform are transferred to the upper platform through the link and the universal joint to induce pivotal movement of the upper platform about the shaft, such that multiaxial vibrations can be induced to the stack of products.

In another aspect of the present application, a method for inducing multiaxial vibrations to simulate an environment for handling a stack of products is provided. The method includes inducing uniaxial vibrations of a lower platform. The lower platform is connected to a lower end of a link. The link includes the lower end, an upper end and a shaft extending between the lower end and the upper end. The upper end of the link includes a universal joint, through which an upper platform is connected to the link. The upper platform has a top surface on which the stack of products can be placed. The method further includes inducing pivotal movement of the upper platform about the shaft by the uniaxial vibrations. The method also includes inducing multiaxial vibrations of the stack of products by the pivotal movement of the upper platform.

In yet another aspect of the present application, a method for making an apparatus for inducing multiaxial vibrations to simulate an environment for handling a stack of products is provided. The method includes providing a lower platform for inducing uniaxial vibrations. The method also includes providing a link, which includes a lower end, an upper end and a shaft extending between the lower end and the upper end. The upper end includes a universal joint. The method further includes providing an upper platform. The upper platform has a top surface on which the stack of products can be placed. Additionally, the method includes connecting the link to the lower platform by the lower end and connecting the link to the upper platform by the universal joint. The uniaxial vibrations of the lower platform are transferred to the upper platform through the universal joint to induce pivotal movement of the upper platform about the universal joint, such that multiaxial vibrations can be induced to the stack of products manufacturing a semiconductor device used for fluorescent-based molecule detection is provided.

DETAILED DESCRIPTION OF EMBODIMENTS

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

Detailed embodiments of the methods and apparatuses of the present disclosure are described herein; however, it is to be understood that the disclosed embodiments are merely illustrative of the disclosed methods and apparatuses that may be embodied in various forms. In addition, each of the examples given in connection with the various embodiments of the disclosure are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure. For the purposes of the description hereinafter, the terms "upper", "lower", "top", "bottom", and derivatives thereof shall relate to the disclosed structures, as they are oriented in the drawing figures.

Figure 1:
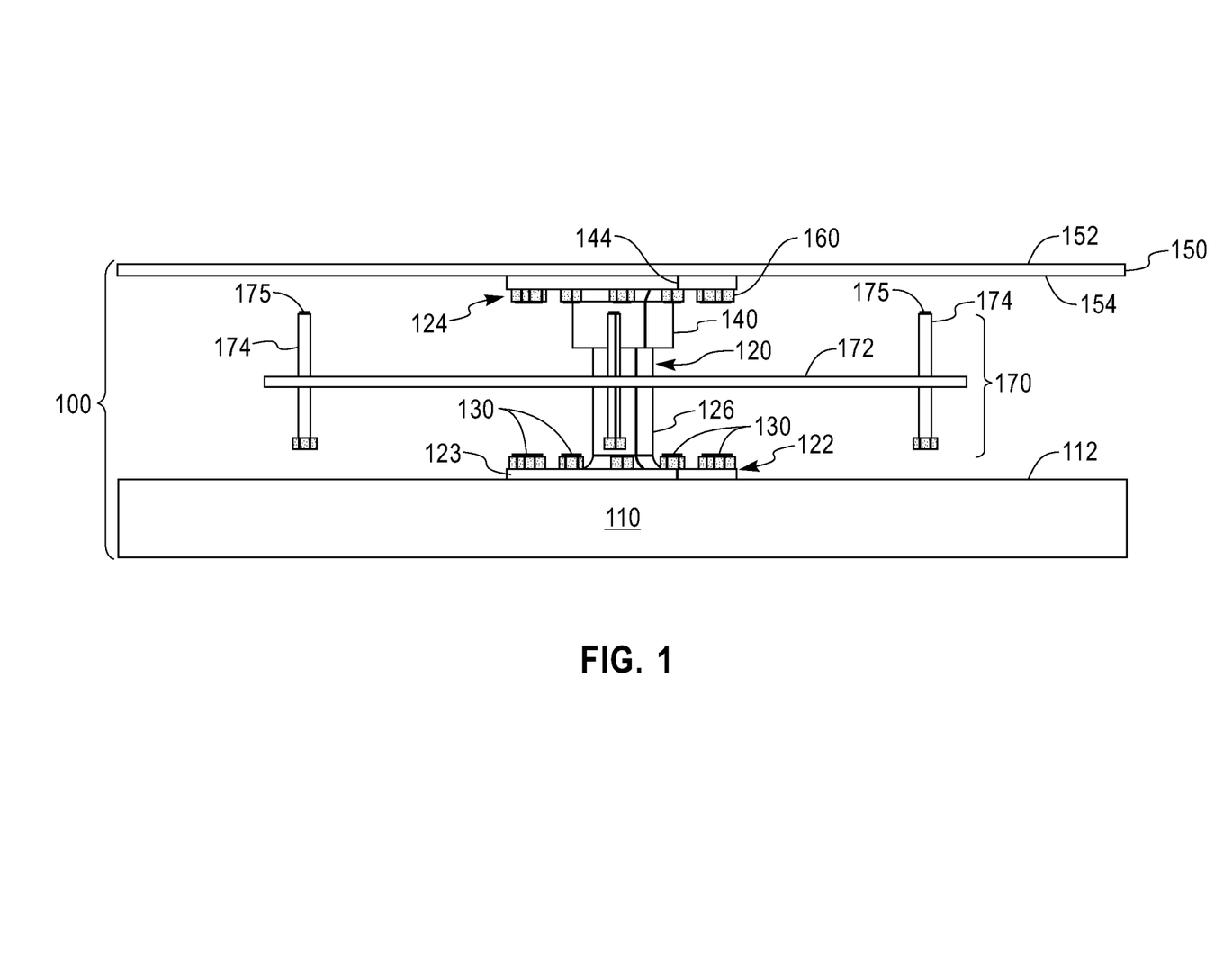
FIG. 1 is a front elevation view of an apparatus for inducing multiaxial vibrations to simulate an environment for handling a stack of products, according to an exemplary embodiment of the present disclosure.
Figure 2:
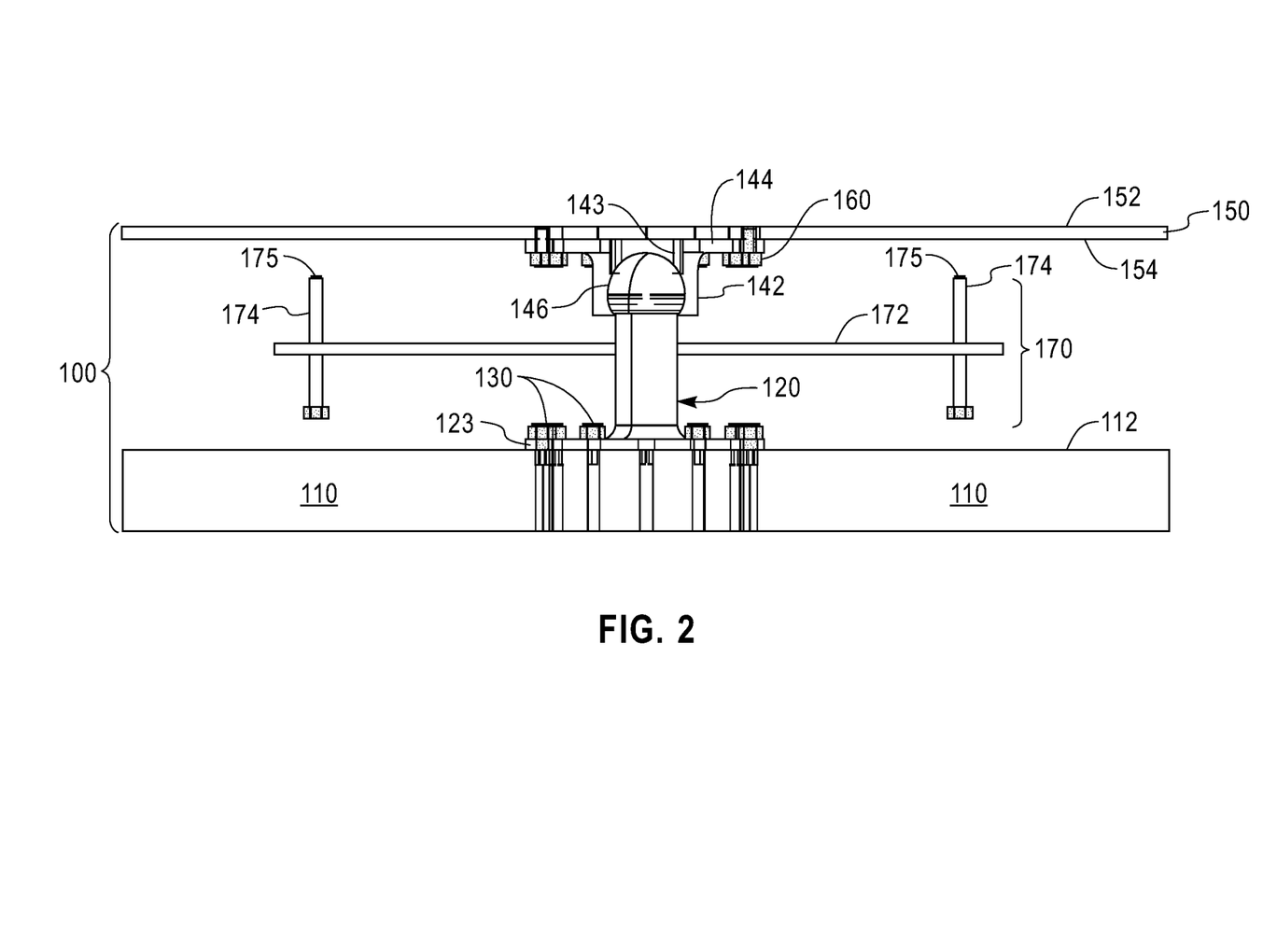
FIG. 2 is a partial sectional view of the apparatus shown in FIG. 1.

FIG. 1 is a front elevation view of an apparatus 100 for inducing multiaxial vibrations to simulate an environment for handling a stack of products (such as, shipping and transporting electronic products, stackable products or food products that typically have a high center of gravity), according to an exemplary embodiment of the present disclosure. FIG. 2 is a partial sectional view of the apparatus 100. In generally, the high center of gravity means that the stack of products having the high center of gravity is prone to tipping over during transportation.

The apparatus 100 includes a lower platform 110 for inducing uniaxial vibrations thereof. The lower platform 110 can be a vertical uniaxial table, which, in some embodiments, induces vertical vibrations with a frequency bandwidth between 2-500 Hz. In addition, the lower platform 110 can be used to induce vibrations in different axial orientation and with different frequency bandwidth. The lower platform 110 can be of any suitable shapes and/or profiles, depending upon the circumstances of applying the apparatus 100.

The apparatus 100 further includes a link 120 connected to the lower platform 110. The link 120 includes a lower end 122, an upper end 124 and a shaft 126 extending between the lower end 122 and the upper end 124. The link 120 is connected to the lower platform 110 by the lower end 122. The link 120 is rigid and can be made of metal or any suitable material, such that any movement of the lower platform 110 can be effectively translated into relevant movement of the link 120. The lower end 122 of the link 120 can have a lower fixing plate 123, which is fixed to a top surface 112 of the lower platform 110 by a plurality of fasteners 130, such as, screws. After the link 120 is assembled to the lower platform 110, the shaft 126 can extend substantially perpendicular to the lower platform 110.

The upper end 124 of the link 120 is provided with a universal joint 140, through which the link 120 is connected to an upper platform 150. The upper platform 150 has a top surface 152, on which a stack of products to be tested can be placed. Referring to FIG. 2, the universal joint 140 includes a socket 142 for defining a space 143 therein. The socket 142 includes an upper fixing plate 144 that is fixed to a bottom surface 154 of the upper platform 150 by a plurality of fasteners 160, for example, screws. The upper end 124, the socket 142 and the upper fixing plate 144 can be formed by two pieces, which allows readily installation of these components.

The universal joint 140 further includes a ball 146, which is operatively received in the space 143. The socket 142 and the ball 146 are configured to permit pivotal movement of the ball 146 within the space 143 with respect to the socket 142. The ball 146 is connected to, or formed integrally with, the shaft 126 of the link 120, such that the socket 142 and the upper platform 150 are both pivotable with respect to the shaft 126. In use, the uniaxial vibrations of the lower platform 110 are transferred to the upper platform 150 through the shaft 126 and the universal joint 140 to induce pivotal movement of the upper platform 150 about the ball 146 and the shaft 126. The pivotal movement of the upper platform 150, in turn, induces multiaxial vibrations to the stack of products having a high gravity center. For example, horizontal vibrations can be induced to the upper part of the stack of products during a laboratory vibration test.

The apparatus 100 also includes a movement limiter 170, which is provided to operatively limit the pivotal movement of the upper platform 150 about the ball 146 and the shaft 126. In the illustrated embodiment, the movement limiter 170 includes a body 172, which is fixedly mounted to the shaft 126 and disposed between the lower platform 110 and the upper platform 150. The movement limiter 170 further includes at least one adjuster 174 moveably mounted to the body 172. The vertical distance between a top surface 175 of the adjuster 174 and the bottom surface 154 of the upper platform 150 is adjustable, as the adjuster 174 moves with respect to the body 172. As a result, the extent of the pivotal movement of the upper platform 150 can be limited by the engagement or interference between the top surface 175 of the adjuster 174 and the bottom surface 154 of the upper platform 150. For example, the body 172 can be a plate having two threaded through openings 173; the adjuster 174 can he two bolts threadedly extending through the openings 173 and movable with respect to the plate by a thread engagement.

Figure 3:
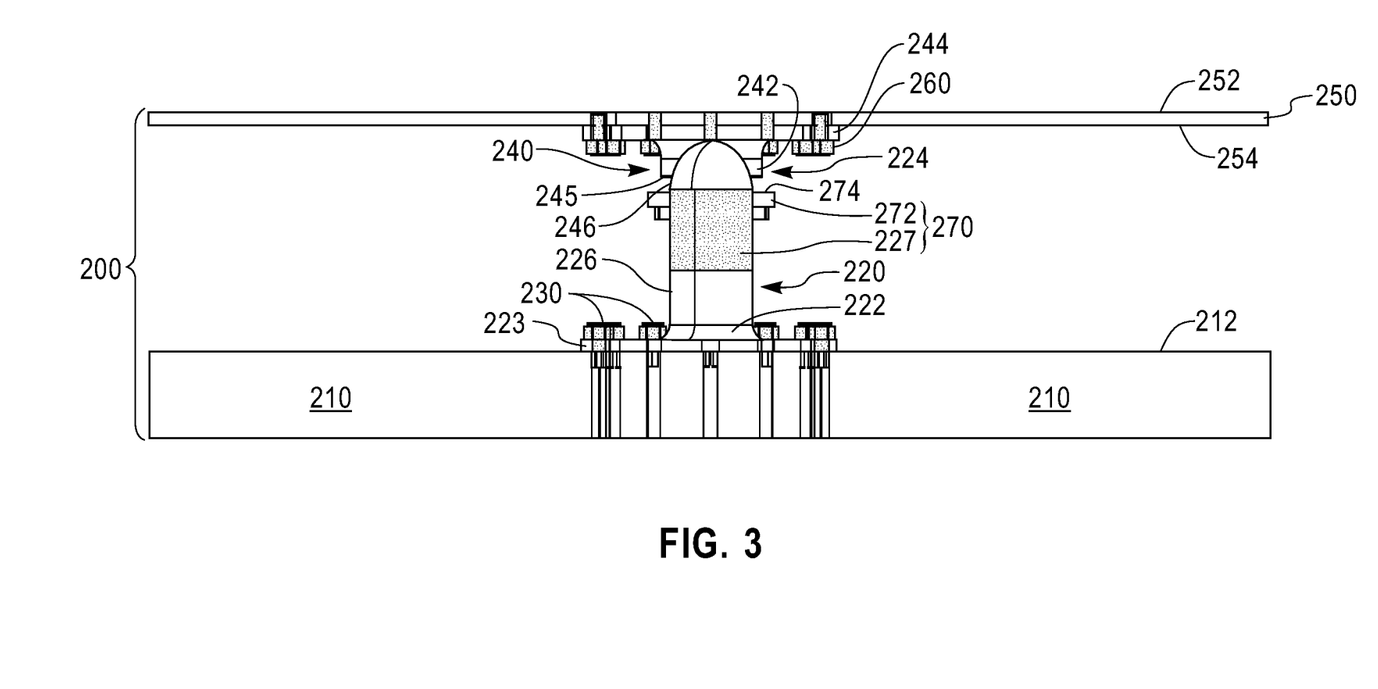
FIG. 3 is a partial sectional view of an apparatus for inducing multiaxial vibrations to simulate an environment for handling a stack of products, according to another exemplary embodiment of the present disclosure.

FIG. 3 is a partial sectional view of an apparatus 200 for inducing multiaxial vibrations to simulate an environment for handling a stack of products (such as, shipping and transporting electronic products stackable products or food products that have a high center of gravity), according to another exemplary embodiment of the present disclosure.

The apparatus 200 includes a lower platform 210 for inducing uniaxial vibrations thereof. The lower platform 210 can be a vertical uniaxial table, which, in some embodiments, induces vertical vibrations with a frequency bandwidth between 2-500 Hz. In addition, the lower platform 210 can be used to induce vibrations in different axial orientations and with different frequency bandwidths. The lower platform 210 can be of any suitable shapes and/or profiles, depending upon the circumstances of applying the apparatus 200.

The apparatus 200 further includes a link 220 connected to the lower platform 210. The link 220 includes a lower end 222, an upper end 224 and a shaft 226 extending between the lower end 222 and the upper end 224. The link 220 is connected to the lower platform 210 by the lower end 222. The link 220 is rigid and can be made of metal or any suitable material, such that any movement of the lower platform 210 can be effectively translated into relevant movement of the link 220. The lower end 222 of the link 220 can have a lower fixing plate 223, which is fixed to a top surface 212 of the lower platform 210 by a plurality of fasteners 230, such as, screws. For example, after the link 220 is assembled to the lower platform 210, the shaft 226 can extend substantially perpendicular to the lower platform 210.

The upper end 224 of the link 220 is provided with a universal joint 240, through which the link 220 is connected to an upper platform 250. The upper platform 250 has a top surface 252, on which a stack of products to be tested can be placed. The universal joint 240 includes a socket 242 for defining a space therein. The socket 242 includes an upper fixing plate 244 that is fixed to a bottom surface 254 of the upper platform 250 by a plurality of fasteners 260, for example, screws.

The universal joint 240 further includes a ball 246, which is operatively received in the space of the socket 242. The socket 242 and the ball 246 are configured to permit pivotal movement of the ball 246 within the space with respect to the socket 242. The ball 246 is connected to, or formed integrally with, the shaft 226 of the link 220, such that the socket 242 and the upper platform 250 are both pivotable with respect to the shaft 226. In use, the uniaxial vibrations of the lower platform 210 are transferred to the upper platform 250 through the shaft 226 and the universal joint 240 to induce pivotal movement of the upper platform 250 about the ball 246 and the shaft 226. The pivotal movement of the upper platform 250, in turn, induces multiaxial vibrations to the stack of products having a high gravity center. For example, horizontal vibrations can be induced to the upper part of the stack of products during a laboratory vibration test.

The apparatus 200 also includes a movement limiter 270, which is provided to operatively limit the pivotal movement of the upper platform 250 about the shaft 226. In the illustrated embodiment, the movement limiter 270 includes a body 272 movably mounted to the shaft 226 and disposed between the lower platform 210 and the upper platform 250. The body 272 has a top surface 274. The vertical distance between the top surface 274 of the body 272 and a bottom surface 245 of the socket 242 is adjustable, as the body 272 moves with respect to the shaft 226. As a result, the extent of the pivotal movement of the upper platform 250 can be limited by the engagement or interference between the top surface 274 of the body 272 and the bottom surface 245 of the socket 242. For example, the body 272 can be a plate, which has a through opening and an inner thread provided to the through opening; the shaft 226 can have a threaded section 227 having an outer thread. The vertical distance between the top surface 274 of the body 272 and the bottom surface 245 of the socket 242 can be adjusted by the engagement between the inner thread and the outer thread.

Figure 4:
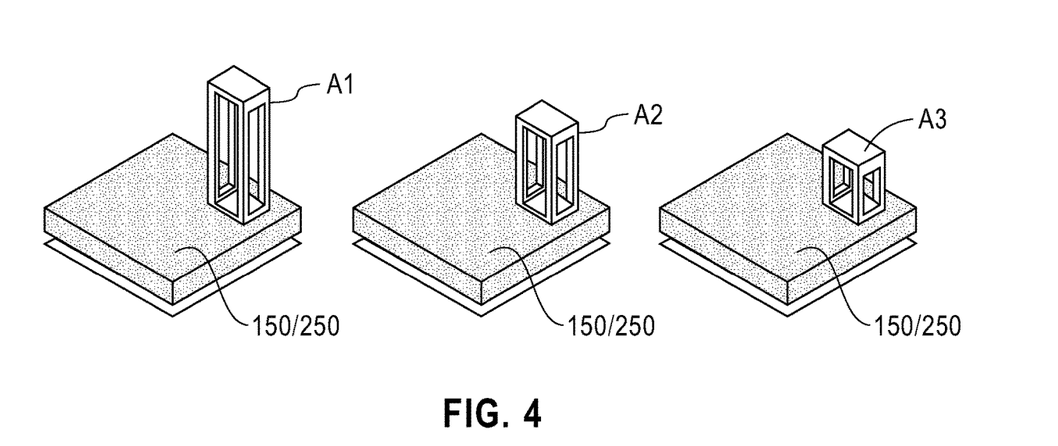
FIG. 4 is a schematic diagram showing a gravity center height variation study conducted with the apparatus shown in FIG. 1 or FIG. 3.

FIG. 4 is a schematic diagram showing a gravity center height variation study conducted on different stacks of products A1-A3, using the apparatus 100 or the apparatus 200. The maximum tilt angle of the upper platform 150 or 250 is set to be 7.5 degrees. The distance from the stacks of products to the center of the upper platform is consistent. For the study purpose, an acceleration of 1 G is inputted in the vertical direction by the lower platform 120 or 220. For the first stack of products A1, which has a gravity center height of 933 mm, the effective multiaxial acceleration obtained is 0.23 G. For the second stack of products A2, which has a gravity center height of three quarters of 933 mm, the effective multiaxial acceleration obtained is 0.14 G. For the third stack of products A3, which has a gravity center height of a half of 933 mm, the effective multiaxial acceleration obtained is 0.07 G. The result of the study indicates that the multiaxial acceleration obtained by the apparatus 100 or 200, for stacks of products having different gravity center heights, is acceptable.

Figure 5:
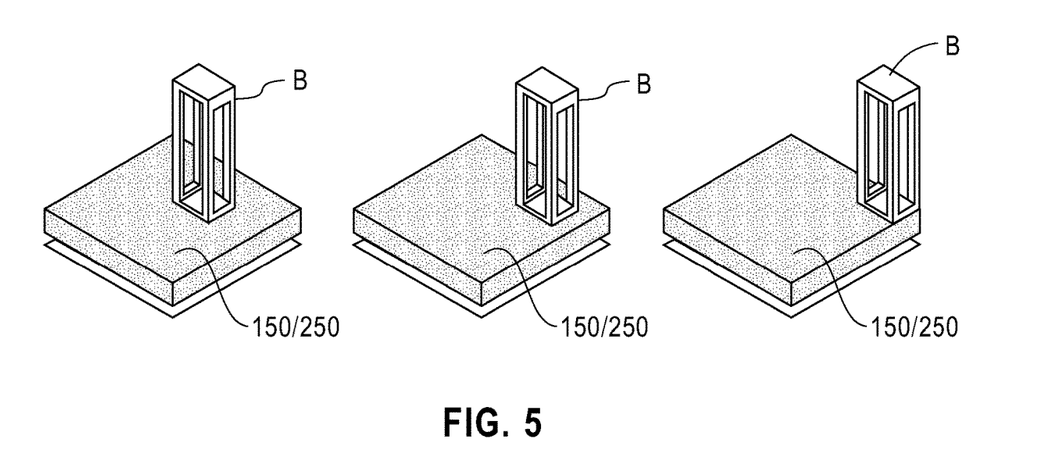
FIG. 5 is a schematic diagram showing a distance from platform center variation study conducted with the apparatus shown in FIG. 1 or FIG. 3.

FIG. 5 is a schematic diagram showing a distance from platform center variation study conducted on a same stack of products B using the apparatus 100 or the apparatus 200. The maximum tilt angle of the upper platform 150 or 250 is set to be 7.5 degrees. The gravity center height of the stack of products is set to be 933 mm. For the study purpose, an acceleration of 1 G is inputted in the vertical direction by the lower platform 120 or 220. When the distance from the stack of products B to the center of the upper platform is set to be zero, the effective multiaxial acceleration obtained for the stack of products B is 0.08 G. When the distance from the stack of products B to the center of the upper platform is set to be 250 mm, the effective multiaxial acceleration obtained is 0.23 G. When the distance from the stack of products B to the center of the upper platform is set to be 500 mm, the effective multiaxial acceleration obtained for B is 0.56 G. The result of the study indicates that the multiaxial acceleration obtained by the apparatus 100 or 200, for different distances from a same stack of products to the center of the upper platform, is acceptable.

Figure 6:
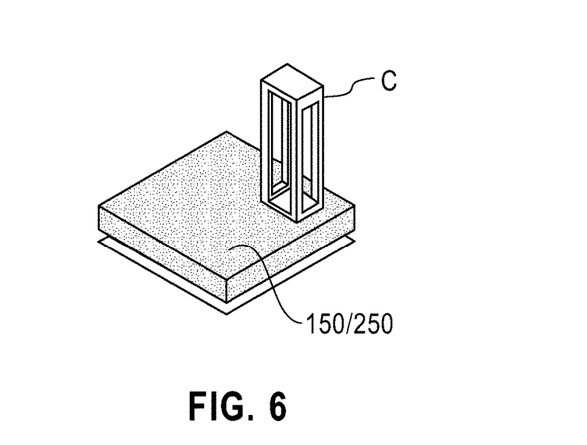
FIG. 6 is a schematic diagram showing a maximum platform tilt variation study conducted with the apparatus shown in FIG. 1 or FIG. 3.

FIG. 6 is a schematic diagram showing a maximum platform tilt variation study conducted on a same stack of products C using the apparatus 100 or the apparatus 200. The gravity center height of the stack of products C is set to be 933 mm. The distance from the stack of products C to the center of the upper platform is set to be 250 mm. For the study purpose, an acceleration of 1 G is inputted in the vertical direction by the lower platform 120 or 220. When the maximum tilt angle of the upper platform 150 or 250 is set to be 2.5 degrees, the effective multiaxial acceleration obtained for the stack of products C is 0.09 G. When the maximum tilt angle of the upper platform 150 or 250 is set to be 5.0 degrees, the effective multiaxial acceleration obtained for the stack of products C is 0.17 G. When the maximum tilt angle of the upper platform 150 or 250 is set to be 7.5 degrees, the effective multiaxial acceleration obtained for the stack of products C is 0.23 G. The result of the study indicates that the multiaxial acceleration obtained by the apparatus 100 or 200, for different maximum tilt angles of the upper platform 150 or 250, is acceptable.

Figure 7:
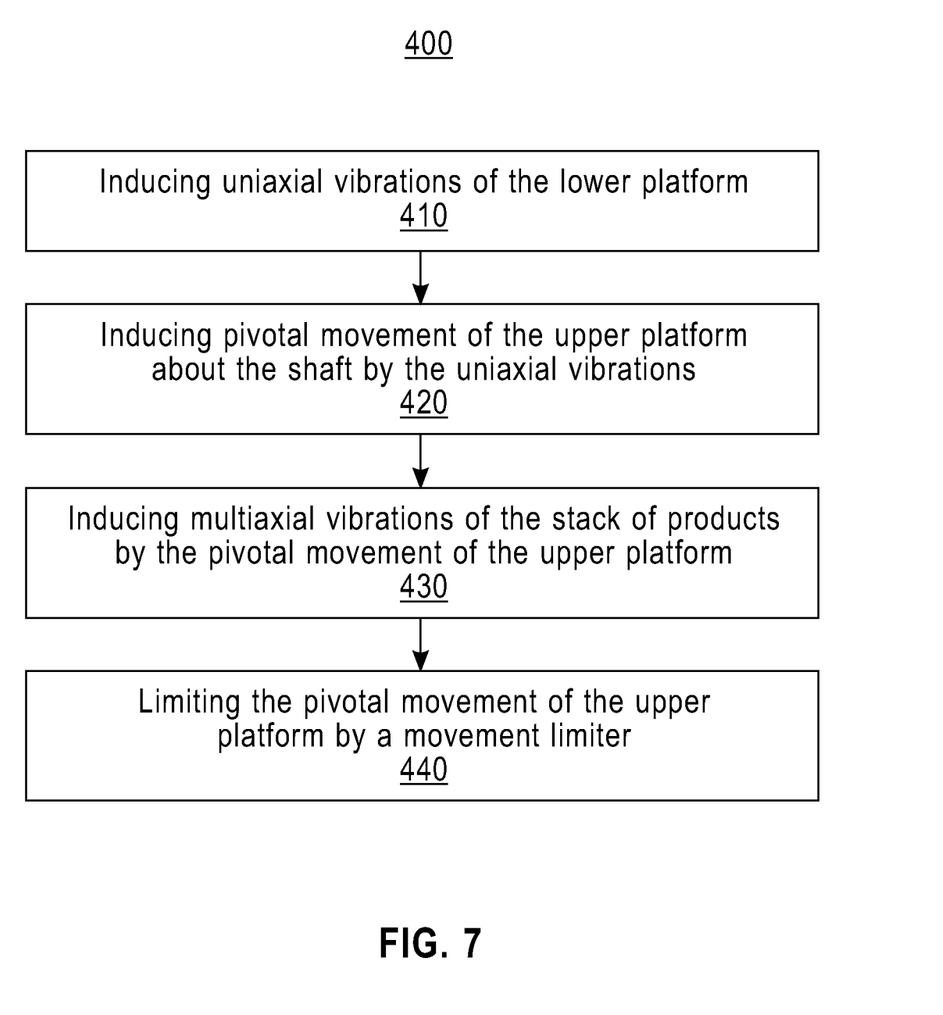
FIG. 7 is a flow chart showing a method for inducing multiaxial vibrations to simulate an environment for handling a stack of products.

FIG. 7 is a flow chart showing a method 400 for inducing multiaxial vibrations to simulate an environment for handling a stack of products. The method 400 can be implemented by the apparatus 100 or 200, as described previously. At step 410, uniaxial vibrations are induced by the lower platform. For example, the uniaxial vibrations of the lower platform can be vertical vibrations. At step 420, pivotal movement of the upper platform about the shaft is induced by the uniaxial vibrations of the lower platform. At step 430, multiaxial vibrations of the stack of products placed on the upper platform is induced by the pivotal movement of the upper platform. At step 440, the pivotal movement of the upper platform can be limited by a movement limiter.

Figure 8:
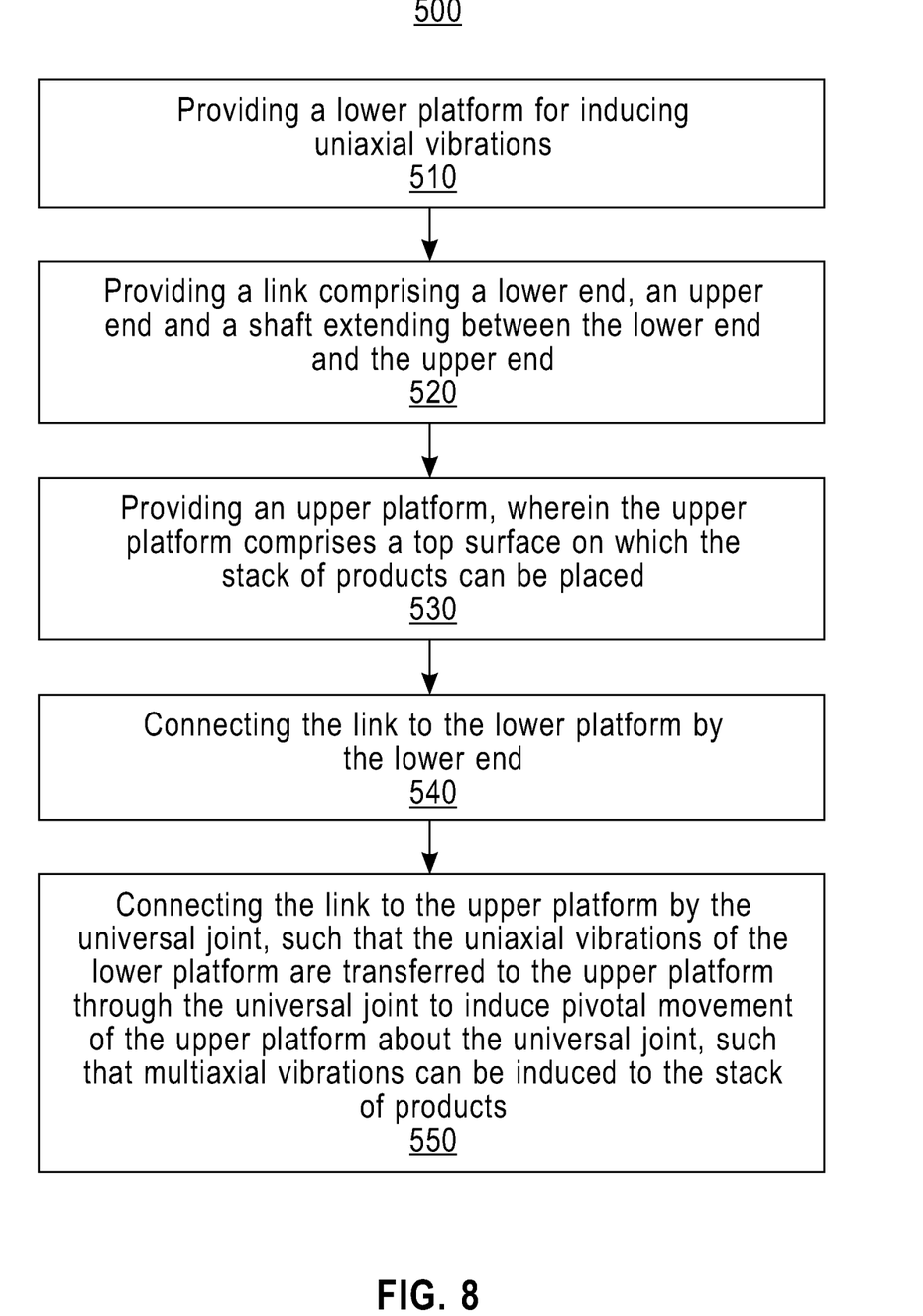
FIG. 8 is a flow chart showing a method for making an apparatus for inducing multiaxial vibrations to simulate an environment for handling a stack of products.

FIG. 8 is a flow chart showing a method 500 for making the apparatus 100 or 200 for inducing multiaxial vibrations to simulate an environment for handling a stack of products. At step 510, a lower platform for inducing uniaxial vibrations is provided. At step 520, a link is provided. The link includes a lower end, an upper end and a shaft extending between the lower end and the upper end. The upper end includes a universal joint. At step 530, an upper platform is provided. The upper platform has a top surface on which the stack of products can be placed. At step 540, the link is connected to the lower platform by the lower end. At step 550, the link is connected to the upper platform by the universal joint. The uniaxial vibrations of the lower platform can be transferred to the upper platform through the shaft and the universal joint to induce pivotal movement of the upper platform about the universal joint. As a result, multiaxial vibrations can be induced to the stack of products.

While the present application has been particularly shown and described with respect to various embodiments thereof, it will be understood by those skilled in the art that the foregoing and other changes in forms and details may be made without departing from the spirit and scope of the present application. It is therefore intended that the present application not be limited to the exact forms and details described and Illustrated, but fall within the scope of the appended claims.

What is claimed is:

1. An apparatus for inducing multiaxial vibrations to simulate an environment for handling a stack of products, comprising:
    a lower platform for inducing uniaxial vibrations;
    a link comprising a lower end, an upper end and a shaft extending between the lower end and the upper end, wherein the link is connected to the lower platform by the lower end;
    a universal joint provided to the upper end of the link; and
    an upper platform connected to the link by the universal joint, wherein the upper platform comprises a top surface on which the stack of products are placed,
    wherein the uniaxial vibrations of the lower platform are transferred to the upper platform through the link and the universal joint to induce pivotal movement of the upper platform about the shaft, such that multiaxial vibrations are induced to the stack of products,
    wherein the apparatus further comprises a movement limiter configured to limit the pivotal movement of the upper platform about the shaft, the movement limiter comprising:
        a body fixedly mounted to the shaft and disposed between the lower platform and the upper platform; and
        at least one adjuster moveably mounted to the body, the adjuster having a top surface,
        wherein the vertical distance between the top surface of the at least one adjuster and a bottom surface of the upper platform is adjustable as the at least one adjuster moves with respect to the body, thereby limiting the pivotal movement of the upper platform.

2. The apparatus according to claim 1, wherein the lower platform is configured to induce vertical vibrations.

3. The apparatus according to claim 1, wherein the lower end of the link comprises a lower fixing plate that is fixed to a top surface of the lower platform by a plurality of fasteners.

4. The apparatus according to claim 1,
    wherein the body comprises a plate having two threaded openings; and
    wherein the at least one adjuster comprises two bolts threadedly extending through the two threaded openings, respectively.

5. An apparatus for inducing multiaxial vibrations to simulate an environment for handling a stack of products, comprising:
    a lower platform for inducing uniaxial vibrations;
    a link comprising a lower end, an upper end and a shaft extending between the lower end and the upper end, wherein the link is connected to the lower platform by the lower end;
    a universal joint provided to the upper end of the link; and
    an upper platform connected to the link by the universal joint, wherein the upper platform comprises a top surface on which the stack of products are placed,
    wherein the uniaxial vibrations of the lower platform are transferred to the upper platform through the link and the universal joint to induce pivotal movement of the upper platform about the shaft, such that multiaxial vibrations are induced to the stack of products,
    wherein the apparatus further comprises a movement limiter configured to limit the pivotal movement of the upper platform about the shaft, the movement limiter comprising:
        a body movably mounted to the shaft and disposed between the lower platform and the universal joint, the body having a top surface; and
        wherein the vertical distance between the top surface of the body and a bottom surface of the universal joint is adjustable as the body moves with respect to the shaft, thereby limiting the pivotal movement of the universal joint and the upper platform.

6. The apparatus according to claim 5, wherein the lower platform is configured to induce vertical vibrations.

7. The apparatus according to claim 5, wherein the lower end of the link comprises a lower fixing plate that is fixed to a top surface of the lower platform by a plurality of fasteners.

8. The apparatus according to claim 5,
    wherein the body comprises a plate, the plate comprising a through opening and an inner thread provided to the through opening;
    wherein the shaft comprises a threaded section having an outer thread; and
    wherein the body is movable with respect to the shaft by the engagement between the inner thread and the outer thread.

* * * * *